United States Patent Office 2,749,334
Patented June 5, 1956

2,749,334

DISAZO DYESTUFFS AND COMPLEX COPPER COMPOUNDS THEREOF

Karl Menzi, Basel, Switzerland, assignor to Ciba Limited, Basel, Switzerland, a Swiss firm No Drawing. Application October 22, 1951,
Serial No. 252,579

Claims priority, application Switzerland November 6, 1950

13 Claims. (Cl. 260—147)

This invention provides new disazo-dyestuffs which, like the product of the formula (1)

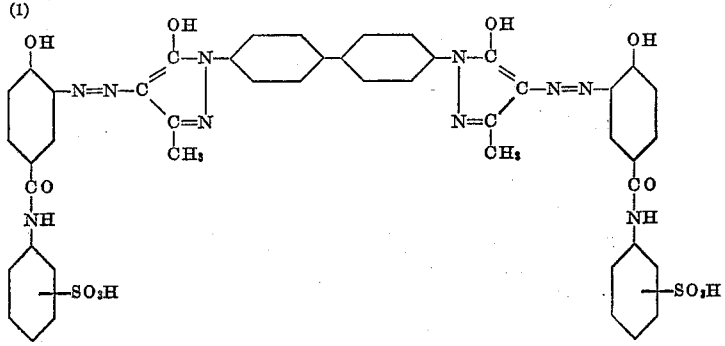

correspond to the general formula (2)

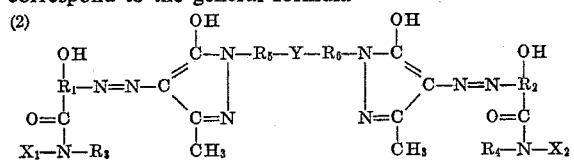

in which $R_1$ and $R_2$ each represent a benzene radical bound to the azo group in ortho-position relatively to the hydroxyl group, $R_3$ and $R_4$ each represent a benzene radical, $X_1$ and $X_2$ each represent a hydrogen atom or an alkyl radical, advantageously a lower alkyl radical, such as an ethyl or methyl group, $R_5$ and $R_6$ each represent a benzene radical, and Y represents a direct bond or a —CO—NH—, —NH—CO—, —NH—CO—NH— or —CH=CH— group, and in which at least one of the radicals —$R_1$—$CONX_1$—$R_3$ and —$R_2$—$CONX_2$—$R_4$ contains a sulfonic acid group.

These dyestuffs are valuable as such or in the form of their complex metal compounds.

The method of preparing the new dyestuffs is apparent from their constitution as given above, and it includes variations obvious to an expert.

For example, two molecular proportions of a diazocompound of a sulfonated amine of the formula (3)

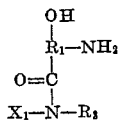

or one molecular proportion of each of two different diazotized amines of the above formula, of which at least one contains a sulfonic acid group, may be coupled with an azo component of the formula (4)

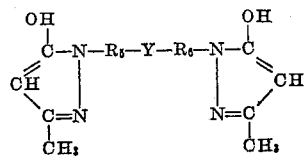

the various symbols having the meanings given in connection with Formula (2). This also applies to the formulae given below.

Valuable results can also be obtained when a total of two molecular proportions of two different diazo compounds of the indicated type, at least one of which contains a sulfonic acid group, are coupled with one molecular proportion of an azo component of the Formula 4, more than one molecular proportion being used of one of the diazo compounds and correspondingly less of the other.

A number of amines free from sulfonic acid groups coming into consideration as diazo-components are known (see for example U. S. Patent No. 2,467,621).

The diazo-components containing sulfonic acid groups may be made, for example, by sulfonating the corre-

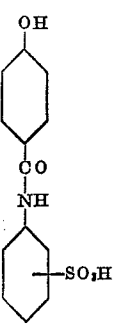

sponding ortho-hydroxy-nitro-compounds free from sulfonic acid groups (for example, by the method described below in Example 1, a sulfonic acid group entering the arylide residue of the ortho-hydroxy-nitro-benzene carboxylic acid arylide), and reducing the nitro group in the resulting product to an amino group, or by reducing the nitro group of an ortho-hydroxy-nitro-benzene carboxylic acid arylide obtainable by the reaction of an ortho-hydroxy-nitro-benzoic acid or a functional derivative thereof, such as 1-hydroxy-2-nitro-benzene-4-, or -5-, or -6-carboxylic acid chloride, 1-hydroxy-benzene-2-nitro-6-chloro-4-carboxylic acid chloride, 1-hydroxy-benzene-2:4-dinitro-6-carboxylic acid chloride or the like, with an aromatic amine containing a sulfonic acid group, such as an amino-benzene-sulfonic acid, for example, meta- or para-amino-benzene-sulfonic acid.

These amines can be diazotized by any one of the usual methods, for example, by means of sodium nitrite and a mineral acid, and then coupled in an alkaline medium, for example, with the following coupling components:

(a) Diphenyl-dipyrazolones such as 3:3'-dimethyl-1:1' - diphenylene - (4:4') - bis - (3 - methyl - 5 - pyrazolone), 3:3'-dichloro- or 3:3'-dimethoxy-1:1'-diphenylene-(4:4')-bis-(3-methyl-5-pyrazolone), 1:1'-diphenylene - (4:4') - bis - (3 - methyl - 5 - pyrazolone) - 3:3'-disulfonic acid and especially 1:1'-diphenylene-(4:4')-bis-(3-methyl-5-pyrazolone) itself (see Formula 1).

(b) Stilbene-dipyrazolones such as stilbene-4:4'-dipyrazolones-2:2'-disulfonic acid of the formula

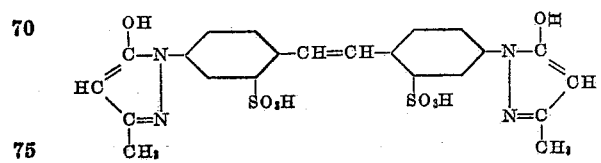

(c) Dipyrazolones such as the compound of the formula

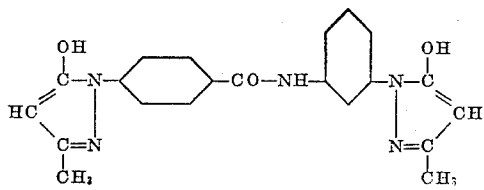

the compound of the formula

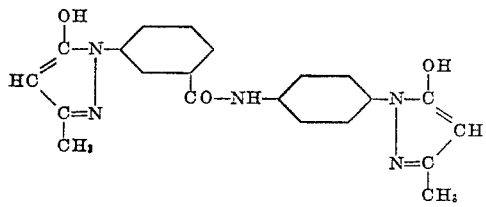

the compound of the formula

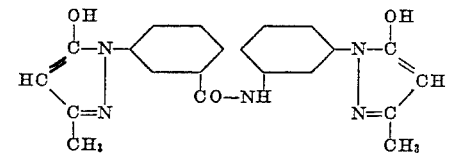

and especially the compound of the formula

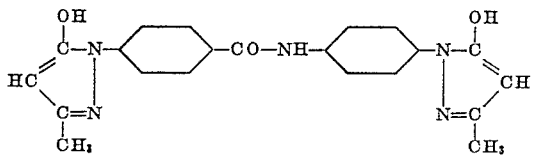

(d) Diphenyl-urea-dipyrazolones such as 3:3'-diphenyl-urea-dipyrazolone, 3:4'-diphenyl-urea-dipyrazolone, or especially 4:4'-diphenyl-urea-dipyrazolone of the formula

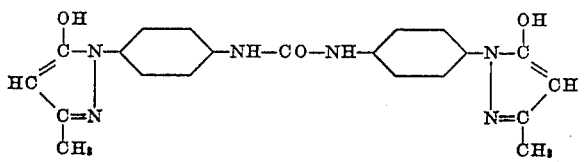

The disazo-dyestuffs obtainable from the coupling components mentioned under (d) can also be made by reacting with phosgene an amino-monoazo-dyestuff of the formula (5)

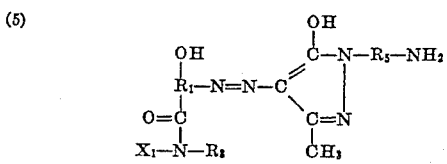

which contains in the radical —$R_1$—$CONX_1$—$R_3$ a sulfonic acid group. Thus, for example, one molecular proportion of phosgene may be reacted with two molecular proportions of such a dyestuff or with one molecular proportion of each of two different dyestuffs of that formula, or one molecular proportion of phosgene may be reacted with one molecular proportion of such an amino-monoazo-dyestuff and one molecular proportion of another amino-monoazo-dyestuff corresponding to the Formula 5, but containing no sulfonic acid group in the radical —$R_1$—$CONX_1$—$R_3$.

The reaction with phosgene may be carried out by one of the usual methods, for example, with the addition of an acid-binding agent. The amino-monoazo-dyestuffs of the Formula 5 used in this connection are in part new, and they can be made by coupling the aminophenyl-pyrazolone with one of the diazo-compounds defined above, for example, by coupling the diazo-compound with 1-(meta- or para-amino)-phenyl-3-methyl-5-pyrazolone.

The disazo-dyestuffs obtainable by the present invention are new and correspond to the above Formula 2. They are suitable for dyeing or printing a very wide variety of materials, for example, animal fibers, such as wool, silk and leather, and especially for dyeing or printing cellulose materials such as cotton, linen and artificial silk or staple fibers of regenerated cellulose. The dyestuffs may be converted in substance, in the dyebath or on the fiber into complex metal compounds, for example, copper, chromium, iron, nickel or cobalt compounds. Conversion into such complex metal compounds is carried out by known methods in an acid, neutral or alkaline medium, under atmospheric or superatmospheric pressure, with or without additions such as salts of inorganic or organic acids such as tartaric acid, acid-binding agents, or agents favouring the formation of complexes, such as pyridine. It is especially useful to prepare the metal compounds, especially the copper compounds, in substance when the metalliferous dyestuff is sufficiently soluble (which is generally the case when the dyestuff contains 3 to 4 sulfonic acid groups). When the dyestuffs of the invention contain only a few groups imparting solubility, for example, only one or two sulfonic acid groups, it is of advantage to treat them on the fiber or partially on the fiber and partially in the dyebath with agents yielding metal by methods in themselves known. For example the process of U. S. Patent No. 2,148,659 of February 28, 1939, to Society of Chemical Industry in Basel, can be used with advantage, in which process first the dyeing and then the treatment with an agent yielding metal are carried out in the same bath. As agents yielding metal there come into consideration preferably those which are stable towards alkaline solutions, such as complex copper tartrates and the like.

In some cases especially valuable dyeings can be obtained by using the process in which a dyeing or print produced with the metal-free dyestuff is after-treated with an aqueous solution containing a basic product from the condensation of formaldehyde with a compound containing at least once the atomic grouping

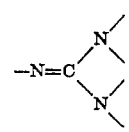

or with a compound, for example, cyanamide, easily convertible into such a compound, and which solution also contains a water-soluble copper compound, especially a complex copper compound. Such a process is described, for example, in British Patent No. 619,969.

The following examples illustrate the invention, the parts and percentages being by weight.

*Example 1*

30.8 parts of 2-amino-1-hydroxy-benzene-4-carboxylic acid-phenylamide-sulfonic acid are dissolved together with 5.5 parts of sodium carbonate in 1500 parts of water, then mixed with 6.9 parts of sodium nitrite, and the whole is then run at 0–5° C. into 40 parts of hydrochloric acid of 30 per cent. strength and 200 parts of water. After about three hours the diazotization is complete. For the purpose of coupling the diazo-suspension is mixed at 4–8° C. with a solution of 17.3 parts of 1:1'-diphenyl-(4:4')-bis-(3-methyl-5-pyrazolone), 10.5 parts of a sodium hydroxide solution of 30 per cent. strength, 30 parts of sodium carbonate and 300 parts of water. After stirring for twelve hours the coupling product is precipitated with sodium chloride, separated by filtration, washed and dried. The new dyestuff

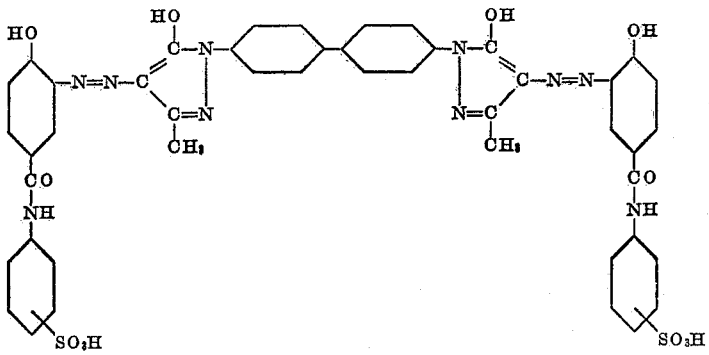

is a red-brown color which dissolves in water with an orange coloration, in dilute sodium carbonate solution with a red-orange coloration and in dilute sodium hydroxide solution and in concentrated sulfuric acid with a yellow coloration. It dyes cotton and fibers of regenerated cellulose by the single bath or two-bath after-coppering process brownish-orange tints of fasteness to washing and excellent fastness to light.

By using, instead of 30.8 parts, 15.4 parts of 2-amino-1-hydroxy-benzene-4-carboxylic acid phenylamide-sulfonic acid and 11.4 parts of 2-amino-1-hydroxy-benzene-4-carboxylic acid phenylamide, or 7.7 parts of 2-amino-1-hydroxy-benzene-4-carboxylic acid phenylamide-sulfonic acid and 17.1 parts of 2-amino-1-hydroxy-benzene-2-carboxylic acid phenylamide, there are obtained dyestuffs of which the coppered dyeings have the same shade and the same good fastness to light, and an even better fastness to washing.

The dyestuff obtained from 15.4 parts of 2-amino-1-hydroxy-benzene-4-carboxylic acid phenylamide-sulfonic acid and 11.4 parts of 2-amino-1-hydroxy-benzene-4-carboxylic acid phenylamide corresponds to the formula

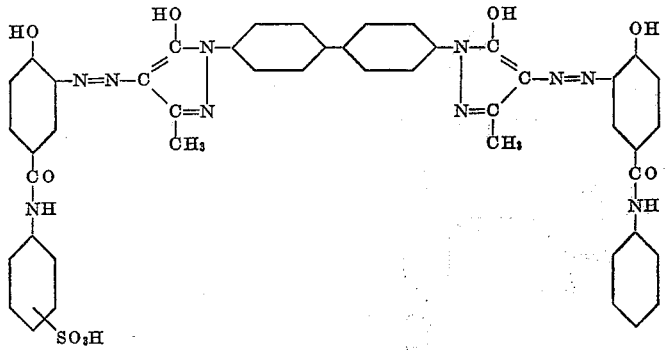

and the last mentioned dyestuff of the foregoing paragraph is a mixture of the composition

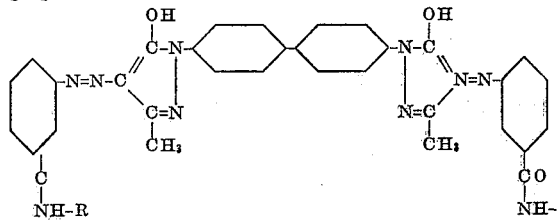

wherein ¼ of the radicals R present in one molecular proportion of dyestuff corresponds to the formula

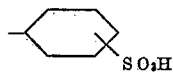

and ¾ of these radicals correspond to the formula

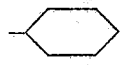

2-amino-1-hydroxy-benzene-4-carboxylic acid phenyl-

-amide-sulfonic acids, which are suitable for the present process can be obtained by the following methods:

(a) 51.6 parts of 2-nitro-1-hydroxy-benzene-4-carboxylic acid phenylamide are introduced in portions into 100 parts of fuming sulfuric acid having an anhydride content of 24 per cent. strength while stirring well. By external cooling care is taken that the temperature does not rise above 25° C. When the addition is complete stirring is continued for a further 30 minutes and the whole is then poured on to ice. There is then added a quantity of sodium hydroxide solution such that the reaction mixture has only a slightly acid reaction, and the sulfonation product is separated by filtration. By reduction with iron and a small amount of acetic acid by the Béchamp-Brimmeyr method there is obtained a pale product which is recrystallized from alcohol of 70 per cent. strength.

(b) 2-amino-1-hydroxy-benzene-4-carboxylic-acid-N-methyl-phenylamide-sulfonic acid can be obtained in the same manner from 2-nitro-1-hydroxy-benzene-4-carboxylic-acid-N-methyl-phenylamide.

(c) 18.3 parts of 1-hydroxy-2-nitro-benzene-4-carboxylic-acid and 13.6 parts of crystalline sodium acetate are dissolved in 50 parts of water. The solution is introduced dropwise while hot into 200 parts of boiling chlorobenzene, a mixture of chloro-benzene and water being distilled off at the same time. The distillation is carried on until the reaction mixture is free from water. The whole is then cooled to 60° C. and 13.1 parts of thionyl chloride are added. In order to chlorinate the carboxyl group completely the whole is heated for one hour under reflux at 90–100° C. The greater part of the chloro-benzene and the unreacted thionyl chloride are then distilled off. 120 parts of pyridine and 17.3 parts of 4-amino-benzene-sulfonic acid are added to the residue, and the whole is maintained at the boil over night under reflux. After the addition of 105 parts of an aqueous solution of 10 per cent. strength of sodium carbonate the reaction mixture is subjected to steam distillation until all the pyridine and the chloro-benzene are removed. In order to separate the 2-nitro-1-hydroxy-benzene-4-carboxylic-acid-phenylamide-4'-sulfonic acid, the whole is acidified with hydrochloric acid and filtered. The filter residue is reduced with iron and a small amount of acetic acid by the Béchamp-Brimmeyr method to form 2-amino-1-hydroxy-benzene-4-carboxylic-acidphenylamide-4'-sulfonic acid. This product is a white crystalline powder soluble in sodium carbonate.

(d) For making 2-amino-1-hydroxy-benzene-4-carboxylic-acid-phenylamide-3'-sulfonic acid the same procedure is followed except that the 4-amino-benzene-sulfonic acid is replaced by an equivalent quantity of 3-amino-benzene-sulfonic acid.

The diazo-components obtainable as described in (a), (b), (c) or (d) can be used for making the dyestuffs as described in the first or second paragraph of this example, and they all yield dyestuffs which possess the properties mentioned and differ only to a very small extent.

*Example 2*

The 1:1'- diphenylene -(4:4')- bis -(3-methyl-5-pyrazolone) used in the first paragraph of Example 1 is replaced by an equivalent quantity of the dipyrazolone of 3:3'-dichloro-4:4'-diamino-diphenyl, 3:3'-dimethyl-4:4'-diamino-diphenyl, 3:3'-dimethoxy-4:4'-diamino-diphenyl, 1-amino-4-(4'-aminobenzoylamino)-benzene, 1-amino-3-(3'-aminobenzoylamino)-benzene or 4:4'diamino-diphenyl-urea. There is obtained in each case a dyestuff which yields on cotton by the single bath or two-bath after-coppering process similar tints also having remarkable fastenss to light.

The dyestuff obtainable from the dipyrazolone of 1-amino-4-(4'-aminobenzoylamino)-benzene corresponds to the formula

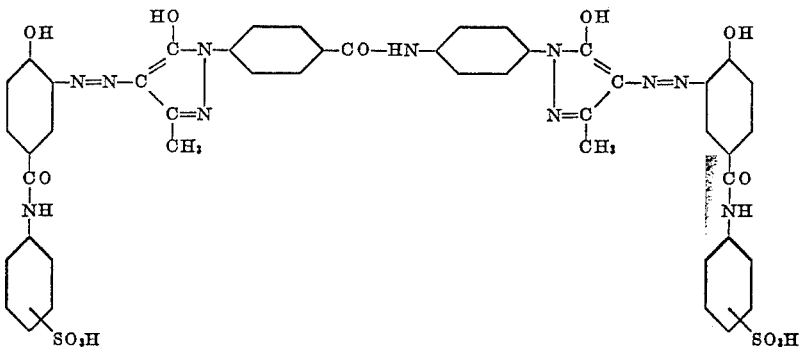

and the dyestuff made from the dipyrazolone of 4:4'-diamino-diphenyl-urea corresponds to the formula

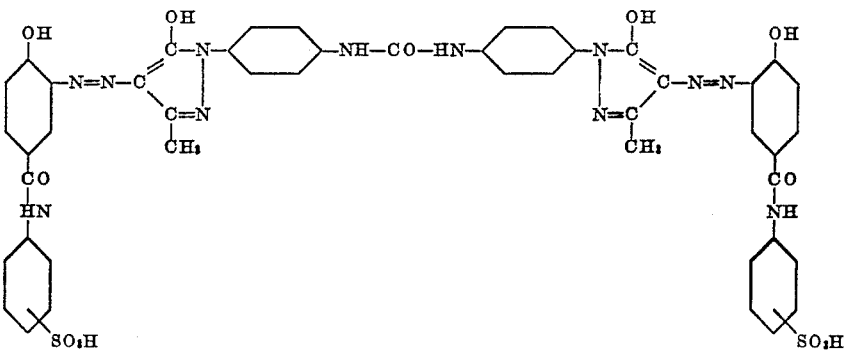

The dipyrazolone of 1-amino-4-(4'-amino-benzoyl-amino)-benzene can be prepared as follows:

22.7 parts of 1-amino-4-(4'-amino-benzoylamino)-benzene are tetrazotized in the usual manner. The tetrazotized solution is run at 0–5° C. into a solution of 92 parts of crystalline stannous chloride in 40 parts of hydrochloric acid of 30 per cent. strength and 30 parts of water. The whole is stirred for two hours, and the precipitated dihydrazine dihydrochloride is separated by filtration. The filter residue is suspended in 150 parts of glacial acetic acid, 30 parts of crystalline sodium acetate are added, and 26 parts of ethyl acetate are introduced dropwise at ordinary temperature. The whole is then slowly heated up to 70–80° C. and maitnained at that temperature for six hours. The reaction mixture is then poured into 1000 parts of water in order to precipitate the dipyrazolone. After being separated by filtration and dried, the new product is a white powder which is insoluble in water and organic solvents, but soluble in an aqueous solution of sodium hydroxide.

1-amino-3-(3'- aminobenzoylamino)- benzene can be converted into its dipyrazolone in the same manner.

*Example 3*

30.8 parts of sulfonated and reduced 2-nitro-1-hydroxy-benzene-4-carboxylic-acid-phenylamide are diazotized in the manner described in Example 1. The diazo-suspension is run into a solution of 20 parts of 1-(4'-aminophenyl)-3-methyl-5-pyrazolone, 4 parts of sodium hydroxide and 30 parts of sodium carbonate in 400 parts of water. After stirring over night the monoazo-dyestuff is separated by acidification with dilute hydrochloric acid, separated by filtration, and washed with water. The amino-azo-dyestuff is treated in a solution rendered alkaline with sodium carbonate with phosgene at 40–50° C. until free amino groups can no longer be detected. By the addition of sodium chloride the disazo dyestuff is precipitated. The dyestuff is identical in dyeing properties with the product of coupling two molecular proportions of diazotized 2-amino-1-hydroxy-benzene-4-carboxylic-acid-phenylamide-sulfonic acid with one molecular proportion of the dipyrazolone of 4:4'-diamino-diphenyl-urea (see Example 2).

*Example 4*

61.6 parts of sulfonated and reduced 2-nitro-1-hydroxy - benzene-4-carboxylic - acid - phenylamide are diazotized as described in Example 1. The diazo-suspension is run at 0–5° C. into a solution of 53.2 parts of dipyrazolone from 4:4'-diamino-stilbene-2:2'-disulfonic acid and 80 parts of sodium carbonate. After stirring over night the dyestuff is precipitated by the addition of sodium chloride, separated by filtration and washed with sodium chloride solution. For the purpose of coppering the disazo-dyestuff is dissolved in 5000 parts of water and there is added at 70–80° C. a copper-tetrammine sulfate solution consisting of 50 parts of crystalline copper sulfate in 200 parts of water and 100 parts of ammonia solution of 20% strength. The whole is maintained for one hour at 70–80° C., and the complex copper compound is precipitated by the addition of sodium chloride. In the dried state the new dyestuff which corresponds to the formula

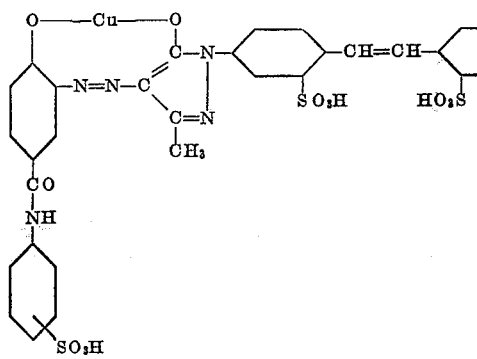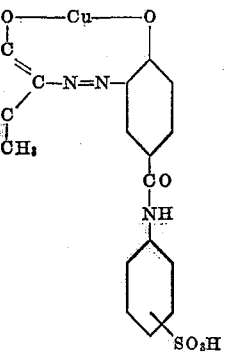

is a red-brown powder which dissolves in water, in dilute sodium carbonate solution and in dilute sodium hydroxide solution with a red-brown coloration and in concentrated sulfuric acid with a yellow coloration. It dyes cotton and fibers of regenerated cellulose yellow-brown tints of good fastness to washing and quite excellent fastness to light.

A dyestuff of quite similar properties is obtained, if in the present example the 2-amino-1-hydroxy-benzene-4-carboxylic-acid-phenylamide-sulfonic acid is replaced by an equivalent quantity of 2-amino-1-hydroxybenzene-4-carboxylic-acid - N - methyl-phenylamide-sulfonic acid.

*Example 5*

100 parts of cotton are entered at 50° C. into a dyebath consisting of 4000 parts of water, 2 parts of anhydrous sodium carbonate and 0.6 part of the dyestuff obtainable as described in Example 1. The temperature is raised in the course of 20 minutes to 90–95° C., 30 parts of crystalline sodium sulfate are added, and dyeing is carried on for 30 minutes at 90–100° C. The whole is then allowed to cool to about 70° C., 1.3 parts of complex sodium copper tartrate of approximately neutral reaction are added, coppering is carried on for half an hour at about 80° C. and then the dyeing is rinsed with cold water. If desired, the dyeing may be soaped by after-treatment with a solution containing 5 parts of soap and 2 parts of anhydrous sodium carbonate in 1000 parts by volume of water. There is 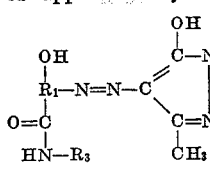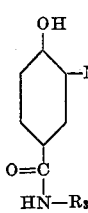 obtained a brownish-orange dyeing of good fastness to washing and very good fastness to light.

What is claimed is:

1. A member selected from the group of disazo dyestuffs and their complex copper compounds which disazo dyestuffs correspond to the formula

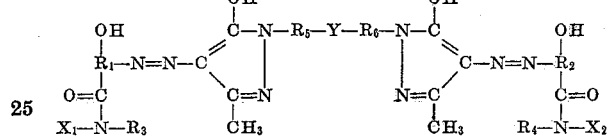

in which $R_1$ and $R_2$ each represent a benzene radical bound to the azo group in ortho-position relatively to the hydroxyl group, $R_3$ and $R_4$ each represent a benzene radical, $X_1$ and $X_2$ each represent a member of the group consisting of a hydrogen atom and a lower alkyl radical, $R_5$ and $R_6$ each represent a benzene radical and Y represents a member selected from the group consisting of a direct bond and the radicals —CO—NH—, —NH—CO—HN— and —CH=CH—, and in which at least one of the radicals —$R_1$—$CONX_1$—$R_3$ and —$R_2$—$CONX_2$—$R_4$ contains a sulfonic acid group.

2. A disazo dyestuff which corresponds to the formula

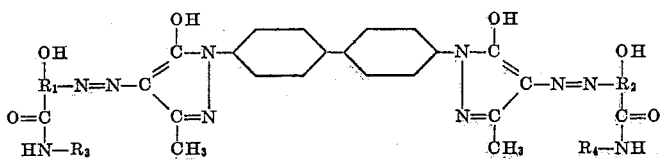

in which $R_1$ and $R_2$ each represent a benzene radical bound to the azo group in ortho-position relatively to the hydroxyl group, $R_3$ and $R_4$ each represent a benzene radical, and at least one of the radicals $R_3$ and $R_4$ contains a sulfonic acid group.

3. A disazo dystuff which corresponds to the formula

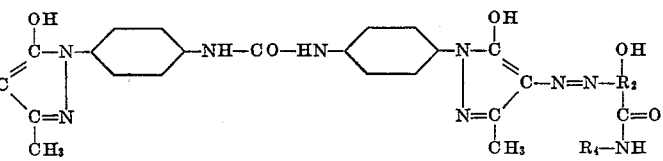

in which $R_1$ and $R_2$ each represent a benzene radical bound to the azo group in ortho-position relatively to the hydroxyl group, $R_3$ and $R_4$ each represent a benzene radical, and at least one of the radicals $R_3$ and $R_4$ contains a sulfonic acid group.

4. A disazo dyestuff which corresponds to the formula

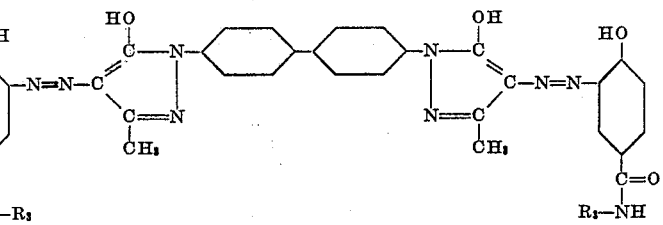

in which $R_3$ and $R_4$ each represent a benzene radical at least one of which contains a sulfonic acid group.

5. A disazo dyestuff which corresponds to the formula

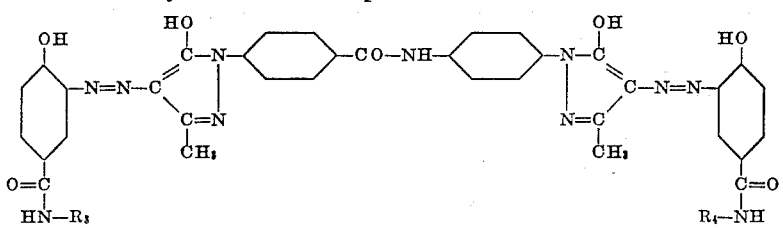

in which $R_3$ and $R_4$ each represent a benzene radical at least one of which contains a sulfonic acid group.

6. A disazo dyestuff which corresponds to the formula

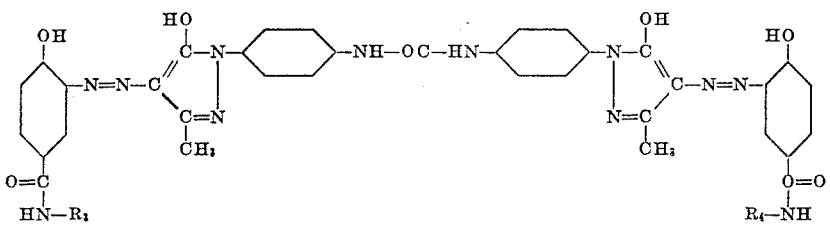

in which $R_3$ and $R_4$ each represent a benzene radical at least one of which contains a sulfonic acid group.

7. A cupriferous disazo dyestuff which corresponds to the formula

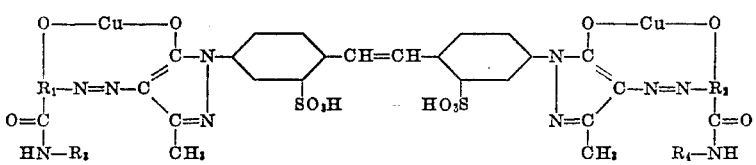

in which $R_1$ and $R_2$ each represent a benzene radical bound to the azo group in ortho-position to the —O—Cu- group, $R_3$ and $R_4$ each represent a benzene radical, and at least one of the radicals $R_3$ and $R_4$ contains a sulfonic acid group.

8. A cupriferous disazo dyestuff which corresponds to the formula

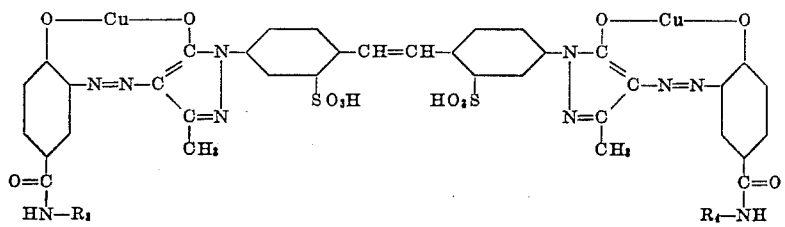

in which $R_3$ and $R_4$ each represent a benzene radical at least one of which contains a sulfonic acid group.

9. A disazo dyestuff of the formula

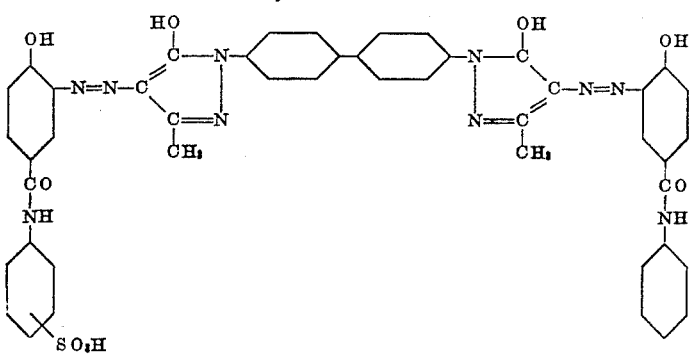

10. A disazo dyestuff of the formula

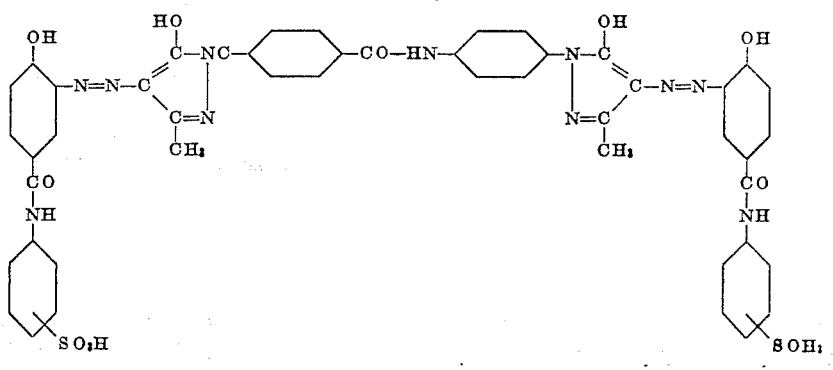

11. A disazo dyestuff of the formula

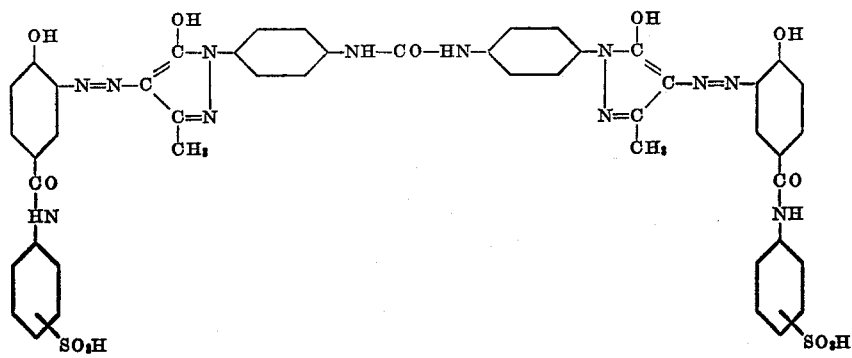

12. A disazo dyestuff of the formula

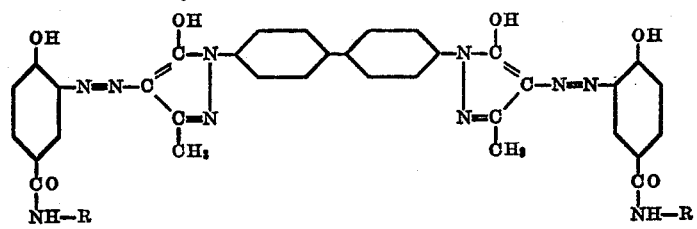

wherein at least ¼ and at the most ½ of the radicals R present in one molecular proportion of dyestuff correspond to the formula

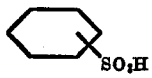

and the remaining part of these radicals corresponds to the formula

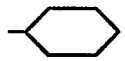

13. A cupriferous disazo dyestuff of the formula

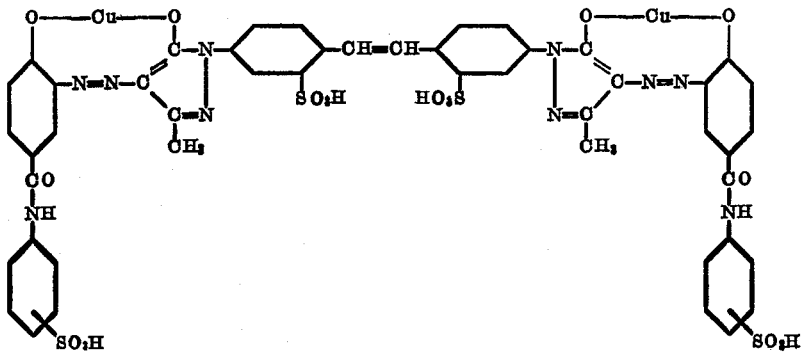

References Cited in the file of this patent
UNITED STATES PATENTS

| | | |
|---|---|---|
| 2,228,374 | Stusser et al. | Jan. 14, 1941 |
| 2,538,180 | Widmer | Jan. 16, 1951 |